United States Patent
Qian

(10) Patent No.: US 6,386,718 B1
(45) Date of Patent: May 14, 2002

(54) PHASE AND FREE SPECTRA RANGE ADJUSTABLE OPTICAL REFLECTORS FOR DENSE WAVELENGTH DIVISION MULTIPLEXING APPLICATIONS

(76) Inventor: Charles X. W. Qian, 2100 White Fir Ct., Cupertino, CA (US) 95014

( * ) Notice: Subject to any disclaimer, the term of this patent is extended or adjusted under 35 U.S.C. 154(b) by 0 days.

(21) Appl. No.: 09/796,565

(22) Filed: Mar. 2, 2001

(51) Int. Cl.[7] .............................................. G02B 7/182
(52) U.S. Cl. ...................... 359/879; 359/883; 359/884; 359/604; 359/608
(58) Field of Search ................................ 359/879, 883, 359/884, 604, 608, 609, 612, 613, 601, 610, 230, 231, 886, 489, 275, 273; 156/99; 52/171, 171.3, 172; 49/63, 62

(56) References Cited

U.S. PATENT DOCUMENTS

| | | | | |
|---|---|---|---|---|
| 3,724,929 A | * | 4/1973 | Lacy | 350/312 |
| 4,282,856 A | * | 8/1981 | Shehl et al. | 126/417 |
| 5,587,828 A | * | 12/1996 | Bernard, Jr. | 359/275 |
| 6,115,401 A | * | 9/2000 | Scobey et al. | 372/100 |
| 6,169,604 B1 | | 1/2001 | Cao | |

* cited by examiner

Primary Examiner—Mohammad Sikder
(74) Attorney, Agent, or Firm—Leonard Tachner

(57) ABSTRACT

Phase and free spectra range adjustable reflectors, referred to herein as nano tuner (NanoT) reflectors, provide building blocks for the manufacturing of passive and active devices used for dense wavelength division multiplexing applications. Specifically, NanoT can be used to fabricate interleavers, multichannel filters and dispersion compensators, optical spectrum synthesizers and other valuable devices. Various embodiments are disclosed. Each provides at least one hermetically sealed optical cavity connected to a tuning device through a channel. The tuning device permits modification to the density of an optical medium contained in the cavity. In the preferred embodiments disclosed, the optical medium comprises one or more selected gases which determine the index of refraction in the cavity. The cavity is formed between two optical windows having facing surfaces coated by partially or wholly reflective coatings. The facing surfaces are separated by a selected distance by a precise spacer. In some embodiments, two cavities are employed and each may contain a wave plate or phase plate.

21 Claims, 5 Drawing Sheets

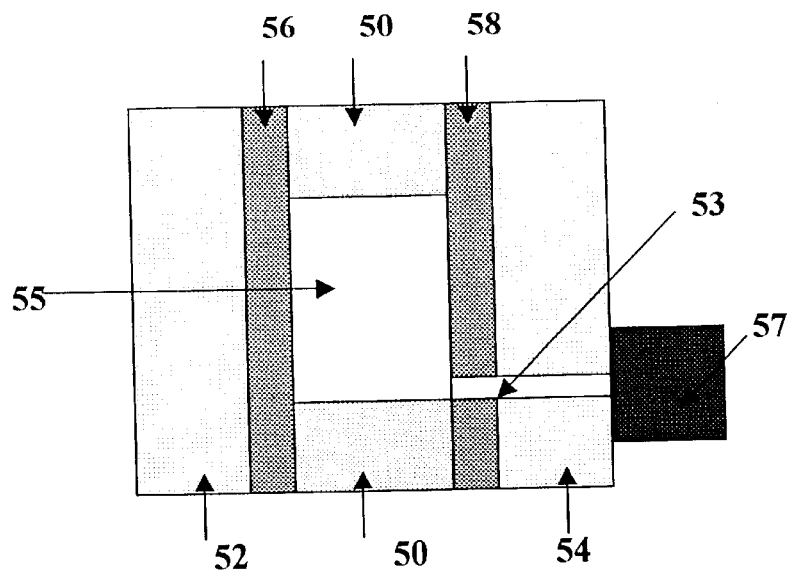
FIG. 5
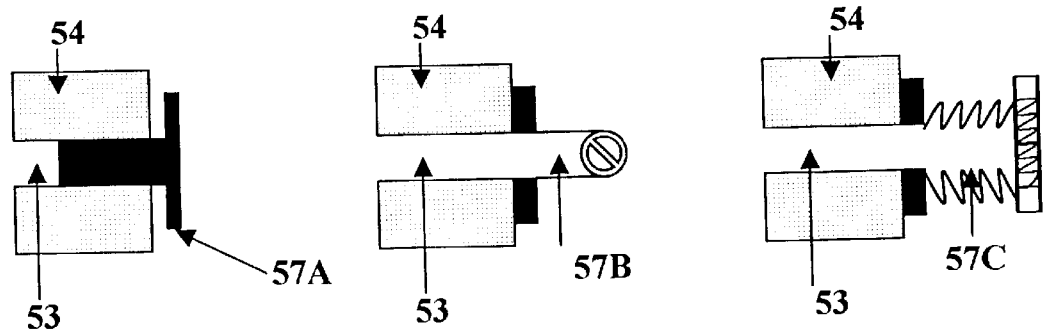
FIG. 6A  FIG. 6B  FIG. 6C

US 6,386,718 B1

PHASE AND FREE SPECTRA RANGE ADJUSTABLE OPTICAL REFLECTORS FOR DENSE WAVELENGTH DIVISION MULTIPLEXING APPLICATIONS

BACKGROUND OF THE INVENTION

1. Field of the Invention

The present invention relates generally to the field of optical communications and more particularly to the fabrication of passive and active devices used in dense wavelength division multiplexing (DWDM) applications.

2. Background Art

Optical communication has been an active area of development and is crucial to the enhancement of several key technological advancements, e.g., Internet and related new technologies. An important technology that enabled a higher data transmission rate is the dense wavelength division multiplexing (DWDM) technology. In many DWDM applications, phase and free spectra range (FSR) adjustable reflecting elements are key components in passive and active devices. As depicted in prior art FIG. 1, a frequently used FSR adjustable device consists of two transparent windows (12, 14) with partially reflective coatings (16, 18) and a precision spacer (10) made of piezo-electric material. The device is frequently referred to as an etalon if the reflectivities of both surfaces are not unity. When one of the surfaces has a reflectivity very close to unity, the device is commonly known as a Gires-Tournois (GT) mirror. The FSR of the device (in Hz) is related to the index of refraction n of the medium inside of the cavity, the thickness of the cavity spacer d, in accordance with $FSR=c/(2nd)$. Here c is the speed of light. Since FSR is determined by optical thickness (nd) of the device, the FSR can be adjusted by changing the thickness of the spacer (i.e., by applying a predetermined voltage). The disadvantage of this type of mirror device is that the thickness of the device may be temperature sensitive and an active voltage is required to maintain a specific value of FSR. Another frequently used two-reflector device is illustrated in prior art FIG. 2. Similar to the device presented in FIG. 1, there are two transparent windows (22, 24) with partially reflective coatings (26, 28) and a precision spacer (20). In addition, there are two transparent precision plates (25, 27) which can be rotated to change their optical thickness. The orientation of 25 may be changed to adjust the FSR of the device whereas 27 may be rotated to change the phase of the incoming light through the device. Such phase and FSR adjustable reflecting devices have found wide usage in DWDM applications. Another prior art, polarization modifying reflecting device is illustrated in FIG. 3. Similar to the devices presented in FIG. 1 and in FIG. 2, there are two transparent windows (32, 34) with partially reflective coatings (36, 38) and a precision spacer (30). In addition there are two transparent precision wave plates (35, 37) which can be rotated to change their optical thickness. The orientation of 35 may be changed to adjust the FSR of the device whereas 37 may be rotated to change the phase of the incoming light through the device. A recently disclosed reflecting device is illustrated in prior art FIG. 4. Similar to the devices presented in FIG. 1 and FIG. 2, there are two transparent windows (42, 44) with partially reflective coatings (46, 48) and a precision spacer (40). In addition there are two transparent precision phase plates (45, 47) which can be rotated to change their optical thickness. The orientation of 45 may be changed to adjust the FSR of the device whereas 47 may be rotated to change the phase of the incoming light through the device. Both phase plates (45, 47) have half of the area covered with other transparent materials. The thickness of each additional half plate is predetermined to give 90 and 180 degrees of relative phase shifts, respectively, for particular wavelengths range required in specific applications. A common problem associated with reflecting devices illustrated in FIGS. 2, 3 and 4 is that the adjustable phase and/or wave plates are difficult to adjust and frequently cause reliability problems in stringent telecom applications.

The most relevant prior art patent appears to be U.S. Pat. No. 6,169,604 to Cao issued Jan. 2, 2001. The Cao patent discloses some of the aforementioned prior art concepts and is therefore incorporated herein by reference as relevant background material.

SUMMARY OF THE INVENTION

The present invention discloses nano tuner (NanoT) reflectors with hermetically sealed cavities and the ways to introduce controlled or adjustable optical medium into these cavities. The optical density of the medium in each of the cavities may be adjusted to yield desired phase and/or FSR values for specific applications. These NanoT reflectors consist of one or two cavities, an optical medium tuner, and phase and wave plates. The optical functions of these NanoT reflectors are identical to the corresponding prior art reflecting devices. Various embodiments are disclosed. Each provides at least one hermetically sealed optical cavity connected to a tuning device through a channel. The tuning device permits modification to the density of an optical medium contained in the cavity. In the preferred embodiments disclosed, the optical medium comprises one or more selected gases which determine the index of refraction in the cavity. The cavity is formed between two optical windows having facing surfaces coated by partially or wholly reflective coatings. The facing surfaces are separated by a selected distance by a precise spacer. In some embodiments, two cavities are employed and each may contain a wave plate or phase plate.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 5 illustrates a FSR adjustable reflecting device in accordance with one embodiment of the present invention;

FIG. 6, comprising FIGS. 6A, 6B and 6C, illustrates examples of three optical density tuners.

FIG. 9, comprising

DETAILED DESCRIPTION OF THE INVENTION

Figure 1:
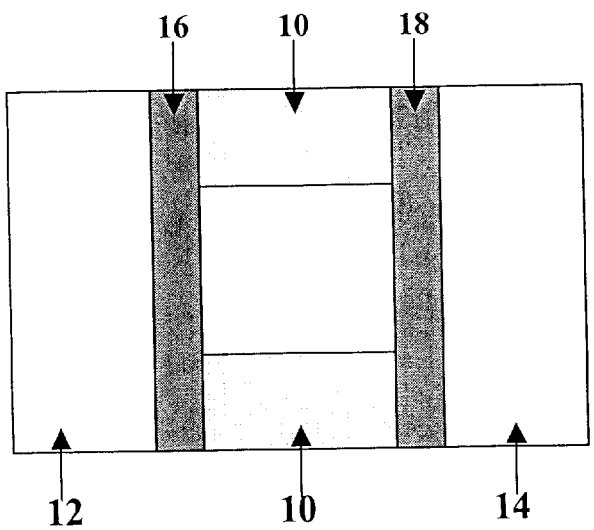
FIG. 1 shows a prior art reflecting device.
Figure 2:
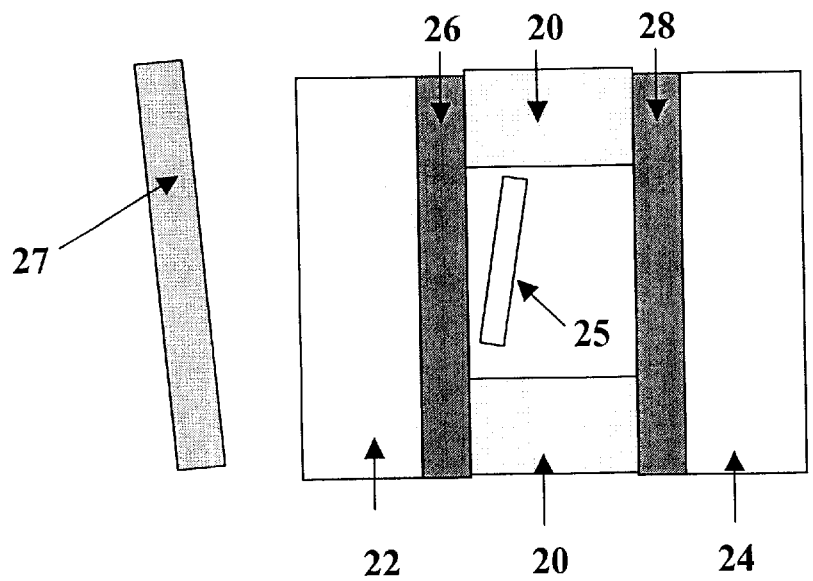
FIG. 2 illustrates a prior art reflecting device in which both the input phase and FSR can be adjusted by rotating two thin windows.
Figure 3:
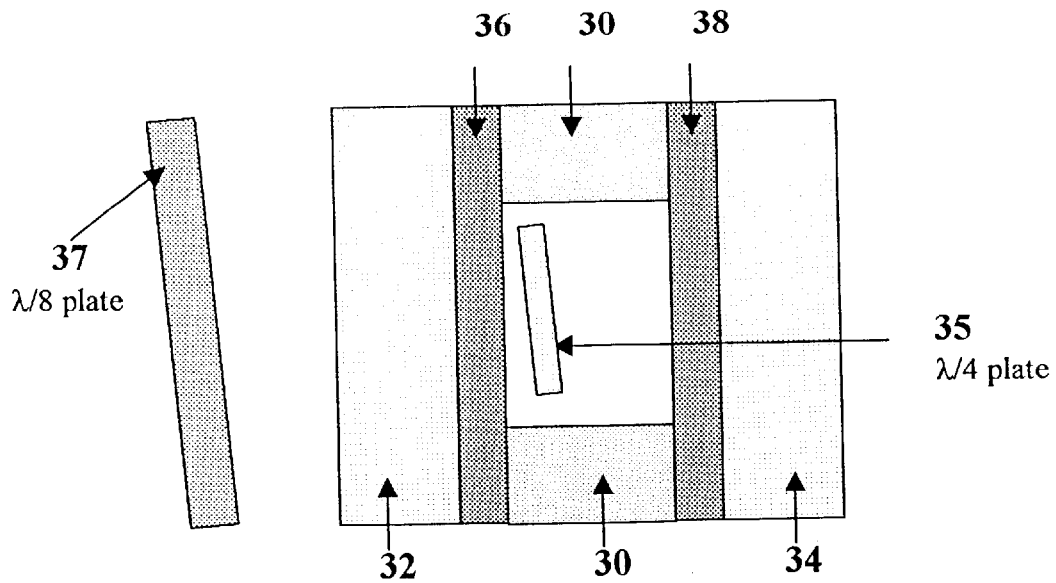
FIG. 3 displays a prior art reflecting device that is polarization sensitive.
Figure 4:
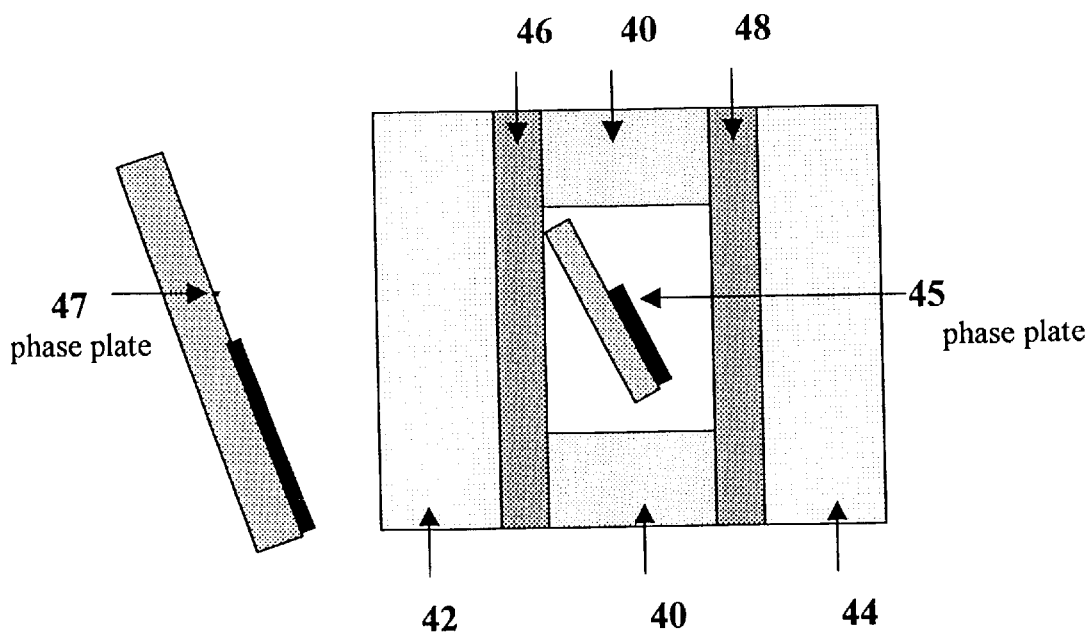
FIG. 4 represents a double pathway-reflecting device with phase and FSR adjustments.

The basic concept of the present invention is to replace mechanical rotation and electrical adjustment of elements in the optical system with adjustments of optical densities of cavities in the optical pathway. One preferred embodiment of the present invention is illustrated in FIG. 5. Two transparent windows 52, 54 are optically contacted (or glued) together with a precision spacer 50, to form a hermetically sealed optical cavity 55. Space 50 may be in the form of a hollow cylinder having windows 52 and 54 as axial end surfaces. There are two reflective coatings 56, 58 with reflectivity and phase modifications designed to meet specific application requirements. The hermetically sealed cavity is further connected to an optical density tuner 57 via a channel 53. The channel 53 may be located on the other window 52 or on the spacer 50 and connected to the optical density tuner 57. In one preferred application associated with interleaver filters for DWDM applications, coating 56 has a reflectivity of about 18% whereas coating 58 has a reflectivity of close to 100%. Reflectivities of as low as 3% and as high as 100% are contemplated. Either of the transparent windows 52, 54 may comprise a portion of the structure of an adjacent optical component. For example, window 52 may be part of an adjacent beam splitter (not shown).

There are three preferred designs for the optical density tuner. In the first design illustrated in FIG. 6A, a plug 57A is used to seal the cavity following the adjustment of the optical density of medium inside of the cavity. This seal maybe further enhanced by glues applied outside of the plug. The second design is detailed in FIG. 6B. In this case, a tube connected with a leak valve 57B is attached to the hermetically sealed optical cavity. The advantage of this arrangement is that the optical medium may be replaced many times for different applications. The third preferred design is illustrated in FIG. 6C. The hermetically sealed cavity is attached to another cavity 57C with adjustable volume. The advantage of this design is that the optical density may be adjusted without breaking the hermetical seal, and such adjustments can be performed on a customer's application site.

Figure 7:
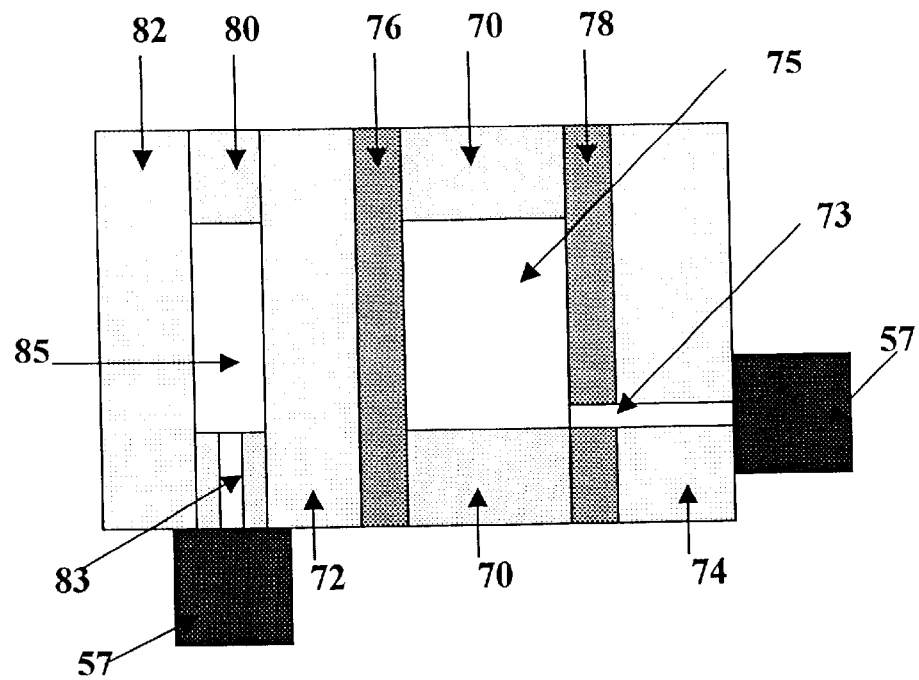
FIG. 7 displays a NanoT system with two cavities.

Another preferred embodiment of the present invention is illustrated in FIG. 7. Two transparent windows 72, 74 are optically contacted (or glued) together with a precision spacer 70, to form a hermetically sealed optical cavity 75. There are two reflective coatings 76, 78 with reflectivity and phase modifications designed to meet specific application requirements. The hermetically sealed cavity is further connected to an optical density tuner 57 via a channel 73. The channel 73 may be located on the other window 72 or on the spacer 70 and connected to the optical density tuner 57. In one preferred application associated with interleaver filters for DWDM applications, 76 has a reflectivity of about 18% whereas 78 has a reflectivity of close to 100%. By contacting (or gluing) a precision spacer 80 and another window 82, a second hermetically sealed optical cavity 85 is formed. This cavity 85 is connected to another optical density tuner 57 through a channel 83, located on spacer 80. The function of this second chamber is to enable the adjustment of the input phase.

Figure 8:
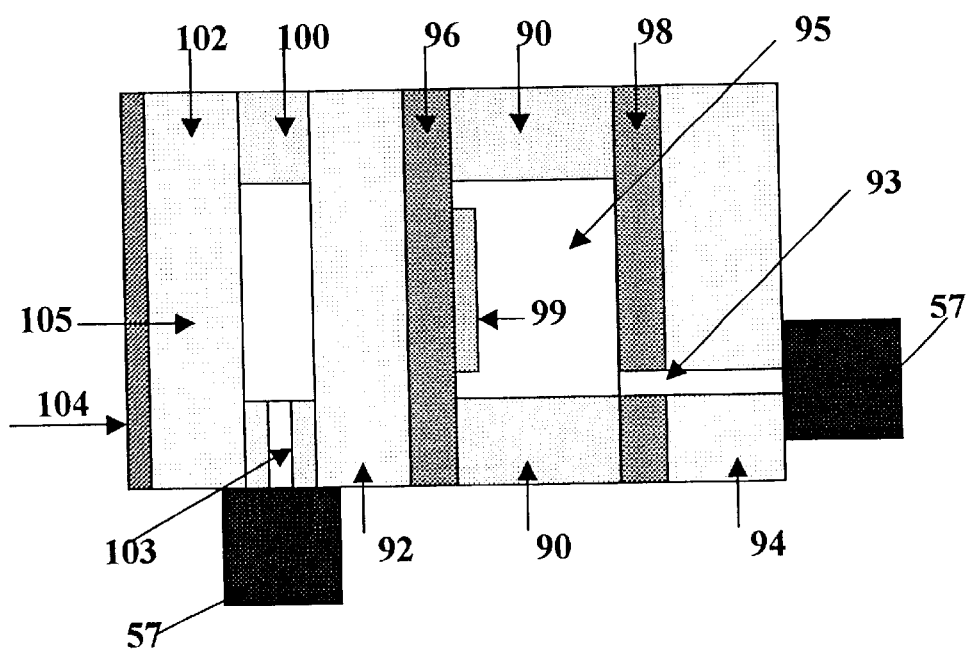
FIG. 8 illustrates another NanoT embodiment with two cavities.

A third preferred embodiment of the present invention is illustrated in FIG. 8. Two transparent windows 92, 94 are optically contacted (or glued) together with a precision spacer 90, to form a hermetically sealed optical cavity 95. There are two reflective coatings 96, 98 with reflectivity and phase modifications designed to meet specific application requirements. The hermetically sealed cavity is connected to an optical density tuner 57 via a channel 93. The channel 93 may be located on the other window 92 or on the spacer 90 and connected to the optical density tuner 57. In one preferred application associated with interleaver filters for DWDM applications, 96 has a reflectivity of about 18% whereas 98 has a reflectivity of close to 100%. By contacting (or gluing) a precision spacer 100 and another window 102, a second hermetically sealed optical cavity 105 is formed. This cavity 105 is connected to another optical density tuner 57 through a channel 103, located on spacer 100. The function of this second chamber is to enable the adjustment of the input phase. In addition, to perform polarization functions, two wave plates 99, 104 are contacted (or glued) to windows 92 and 102, respectively. In one preferred application, wave plate 99 is a quarter wave plate whereas wave plate 104 is a one eighth wave plate. Wave plates of from 1/16 to 1 full wavelength are contemplated, although greater wave plate optical thicknesses are not excluded.

Figure 9A:
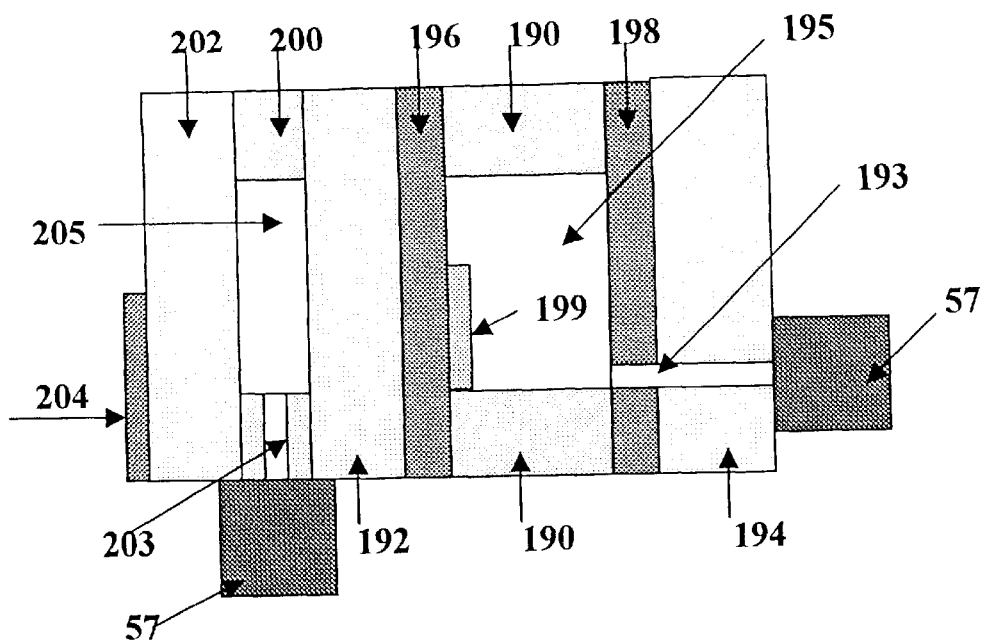
FIGS. 9A and 9B, illustrates two NanoT embodiments in which there are two optical pathways with relative input phase and FSR plates.

The fourth preferred embodiment of the present invention is illustrated in FIG. 9A. Two transparent windows 192, 194 are optically contacted (or glued) together with a precision spacer 190, to form a hermetically sealed optical cavity 195. There are two reflective coatings 196, 198 with reflectivity and phase modifications designed to meet specific application requirements. The hermetically sealed cavity is further connected to an optical density tuner 57 via a channel 193. The channel 193 may be located on the other window 192 or on the spacer 190 and connected with the optical density tuner 57. In one preferred application associated with interleaver filters for DWDM applications, 196 has a reflectivity of about 18% whereas 198 has a reflectivity of close to 100%. By contacting (or gluing) a precision spacer 200 and another window 202, a second hermetically sealed optical cavity 205 is formed. This cavity 205 is connected to another optical density tuner 57 through a channel 203, located on spacer 200. The function of this second chamber is to enable the adjustment of the input phase. In addition, to perform split beam functions, two transparent phase plates 199, 204 are contacted (or glued) to windows 192 and 202, respectively. In one preferred application, phase plate 199 is a 180 degree phase plate whereas phase plate 204 is a 90 degree phase plate. Phase plates providing as little as 10 degrees and as much as 350 degrees phase shift, are contemplated, although greater phase plate optical thicknesses are not excluded.

Figure 9B:
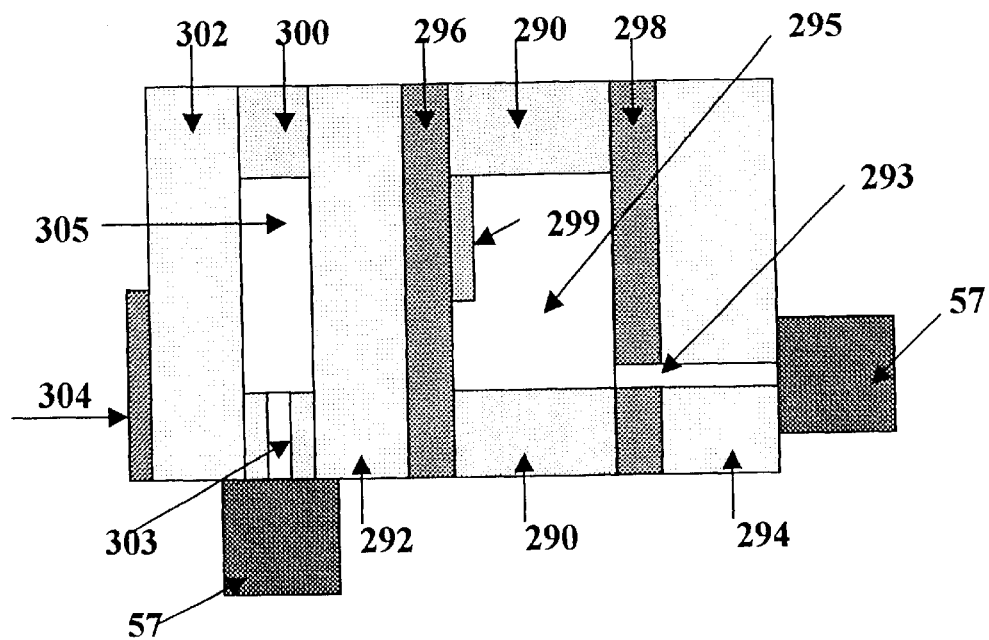

The fifth preferred embodiment of the present invention is illustrated in FIG. 9B. Two transparent windows 292, 294 are optically contacted (or glued) together with a precision spacer 290, to form a hermetically sealed optical cavity 295. There are two reflective coatings 296, 298 with reflectivity and phase modifications designed to meet specific application requirements. The hermetically sealed cavity is further connected to an optical density tuner 57 via a channel 293. The channel 293 may be located on the other window 292 or on the spacer 290 and connected with the optical density tuner 57. In one preferred application associated with interleaver filters for DWDM applications, coating 296 has a reflectivity of about 18% whereas coating 298 has a reflectivity of close to, 100%. By contacting (or gluing) a precision spacer 300 and another window 302, a second hermetically sealed optical cavity 305 is formed. This cavity 305 is connected to another optical density tuner 57 through a channel 303, located on spacer 300. The function of this second chamber is to enable the adjustment of the input phase. In addition, to perform split beam functions, two transparent phase plates 299, 304 are contacted (or glued) to windows 292 and 302, respectively. In one preferred application, phase plate 299 is a 180 degree phase plate whereas phase plate 304 is a 90 degree phase plate.

In each of the embodiments of the invention illustrated herein, it is contemplated that materials are selected to minimize thermally-induced inaccuracies. Thus, by way of example, precision spacer 50 of FIG. 5 would preferably be made of a material having a low coefficient of thermal expansion such as Corning ULE ceramic glass.

It will be apparent to those with ordinary skill of the art that many variations and modifications can be made to the NanoT reflectors disclosed herein without departing form the spirit and scope of the present invention. It is therefore intended that the present invention cover the modifications and variations of this invention provided that they come within the scope of the appended claims and their equivalents.

I claim:

1. An adjustable optical reflector of DWDM systems, the reflector comprising:
    a pair of spaced optically transparent windows having facing surfaces, each such facing surface having at least a partially reflective coating, said surfaces being separated by a precision spacer having an optical-wavelength-based length and forming an hermetically sealed optical cavity between said windows and within said spacer.

2. The optical reflector recited in claim 1 further comprising a channel into said cavity from a location outside said reflector.

3. The optical reflector recited in claim 2 wherein said cavity contains a fluid optical medium of a selected density.

4. The optical reflector recited in claim 3 further comprising a tuning device connected to said channel for altering said selected density of said fluid optical medium.

5. The optical reflector recited in claim 4 wherein said tuning device comprises a removable plug in said channel for either increasing or decreasing the amount of said fluid optical medium in said cavity.

6. The optical reflector recited in claim 4 wherein said tuning device comprises a valve in fluid communication with said channel for either increasing or decreasing the amount of said fluid optical medium in said cavity.

7. The optical reflector recited in claim 4 wherein said tuning device comprises a variable volume chamber in fluid communication with said channel for changing the combined volume of said cavity and said chamber.

8. The optical reflector recited in claim 3 wherein said fluid optical medium comprises a gas taken from the group consisting of $N_2$, $O_2$, Ne, Ar, Kr, Xe, $SF_6$ and mixtures thereof.

9. The optical reflector recited in claim 1 wherein each of said facing surfaces has a reflective coating with a reflectivity in the range of 3% to 100%.

10. The optical reflector recited in claim 1 wherein one of said facing surfaces has a reflective coating having a reflectivity that is greater than the reflectivity of the reflective coating of the other facing surface.

11. The optical reflector recited in claim 1 further comprising a third optically transparent window spaced from one of said pair of windows by an additional precision spacer and thereby forming a second hermetically sealed optical cavity.

12. The optical reflector recited in claim 11 further comprising a channel into each said cavity from respective locations outside said reflector.

13. The optical reflector recited in claim 12 wherein each said cavity contains a fluid optical medium of a selected density.

14. The optical reflector recited in claim 13 further comprising respective tuning devices connected to said channels for altering said selected density of said fluid optical medium in each of said cavities.

15. The optical reflector recited in claim 14 wherein at least one of said tuning devices comprises a removable plug in said channel for either increasing or decreasing the amount of said fluid optical medium in said cavity.

16. The optical reflector recited in claim 14 wherein at least one of said tuning devices comprises a valve in fluid communication with said channel for either increasing or decreasing the amount of said fluid optical medium in said cavity.

17. The optical reflector recited in claim 14 wherein at least one of said tuning devices comprises a variable volume chamber in fluid communication with said channel for changing the combined volume of said cavity and said chamber.

18. The optical reflector recited in claim 11 further comprising a wave plate in at least one said cavity.

19. The optical reflector recited in claim 18 wherein each of said wave plates corresponds to an optical thickness in the range of $\frac{1}{16}$ to $\eta$ wavelengths of light in said reflector where $\eta$ is an integer which is greater than or equal to 1.

20. The optical reflector recited in claim 11 further comprising a phase plate in at least one of said cavities.

21. The optical reflector recited in claim 20 wherein each of said phase plates corresponds to an optical thickness in the range of 10 degrees to $\eta \times 360$ degrees of phase of light in said reflector where $\eta$ is an integer which is greater than or equal to 1.

\* \* \* \* \*